(12) United States Patent
Vrotsos

(10) Patent No.: US 6,923,852 B2
(45) Date of Patent: Aug. 2, 2005

(54) FLUE GAS DESULFURIZATION SYSTEM WITH A STEPPED TRAY

(75) Inventor: Jeffery J. Vrotsos, Wadsworth, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 2 days.

(21) Appl. No.: 10/279,425

(22) Filed: Oct. 24, 2002

(65) Prior Publication Data

US 2004/0079235 A1 Apr. 29, 2004

(51) Int. Cl.[7] ............................................. B01D 47/06
(52) U.S. Cl. ..................... 96/296; 95/213; 95/224; 95/235; 96/297; 261/113; 261/114.5
(58) Field of Search ................. 95/210, 213, 235, 95/224; 96/290, 296, 297, 299; 261/113, 114.1, 114.3, 114.5

(56) References Cited

U.S. PATENT DOCUMENTS

| | | | | |
|---|---|---|---|---|
| 337,446 A | * | 3/1886 | Scott et al. | ............... 261/114.1 |
| 489,147 A | * | 1/1893 | Golding | ...................... 202/177 |
| 1,908,782 A | | 5/1933 | Pearce | |
| 2,645,467 A | * | 7/1953 | Rupp | ...................... 261/114.1 |
| 2,812,167 A | * | 11/1957 | Fabyan | ......................... 261/30 |
| 4,263,021 A | | 4/1981 | Downs et al. | |
| 4,269,812 A | | 5/1981 | Edwards et al. | |
| 4,343,771 A | | 8/1982 | Edwards et al. | |
| 5,173,093 A | | 12/1992 | Johnson et al. | |
| 5,246,471 A | | 9/1993 | Bhat et al. | |
| 5,403,568 A | | 4/1995 | Stowe | |
| 5,451,250 A | | 9/1995 | Gohara et al. | |
| 5,620,144 A | | 4/1997 | Strock et al. | |
| 5,641,338 A | * | 6/1997 | Brookman | ................... 95/213 |

OTHER PUBLICATIONS

*Steam,* Its Generation and Use, 40th Edition, The Babcock & Wilcox Company, ©1992, pp. 35–1 to 35–11.
Watson et al., "Advanced, Low–Pressure–Drop, Tower Inlet Design," EPRI–DOE–EPA Combined Utility Air Pollutant Control Symposium, Aug. 16–20, 1999, Atlanta, GA, Figure 4, pp. 1–2.
"Electric Utility Engineer's FGD Manual vol. I—FGD Process Design", Final Report, DE–FG22–95PC94256–99, Mar. 4, 1996, Radian International LLC, Austin, TX, pp.1.4.2–1 to 1.4.2.–17.

* cited by examiner

Primary Examiner—Duane S. Smith
(74) Attorney, Agent, or Firm—Kathryn W. Grant; Michael J. Seymour; Eric Marich

(57) ABSTRACT

A stepped, perforated tray is provided for increasing the available gas-slurry contact area in a flue gas desulfurization chamber. The tray redirects the horizontal flow upwardly through the tray for increased surface area and contact time with slurry for removing $SO_x$ or other contaminants from a fossil fuel combustion flue gas before releasing the flue gas to the atmosphere. The tray is adaptable for use in vertical tower systems as well.

19 Claims, 4 Drawing Sheets

FLUE GAS DESULFURIZATION SYSTEM WITH A STEPPED TRAY

FIELD AND BACKGROUND OF INVENTION

The present invention relates generally to the field of industrial combustion processes and in particular to a new and useful apparatus and method for removing contaminants from combustion gases prior to release into the atmosphere.

Fossil fuel combustion is used in industrial processes for many different purposes. Coal and natural gas are commonly burned to heat steam in electric power generation plants, for example. Unfortunately, fossil fuel combustion produces several contaminants which have been found to be detrimental to the environment. In particular, sulfur and nitrogen oxide compounds are major components of "acid rain", which is harmful to plants.

In recognition of the harm caused by SOx and NOx compounds, different combustion gas cleaning systems have been developed to remove these components of combustion flue gases prior to release of the flue gases into the atmosphere.

Flue gas desulfurization systems are one such flue gas cleaning system. For a general description of the characteristics of flue gas desulfurization systems, the reader is referred to Chapter 35 of *Steam/Its Generation and Use*, 40th Edition, The Babcock & Wilcox Company, Barberton, Ohio, U.S.A., ©1992, the text of which is hereby incorporated by reference as though fully set forth herein.

Flue gas desulfurization systems and other liquid-gas contact processes have been designed and constructed using a perforated metal tray to produce and support a liquid-gas mixing or contact zone in which the vertically flowing gas passes up through the perforations as a liquid slurry or solution containing the reagent is falling down through the same perforations. An example of such a system is described in U.S. Pat. No. 4,263,021 for a "Gas-Liquid Contact System" assigned to the Babcock & Wilcox Company, which is hereby incorporated by reference as though fully set forth herein.

FIG. 1 herein illustrates the prior art flue gas cleaning system of U.S. Pat. No. 4,263,021. A gas, such a flue gas 40, is passed upwardly from inlet 55 at velocities of 5–20 feet per second through an upright tower 50 in counter-current contact with liquid, such as liquid slurry 65 which is introduced near the top through one or more spray headers 68 and discharged from the bottom of the tower. One or more horizontally disposed perforated plates, each forming a tray 60, is positioned intermediate the height of the tower 50. Each plate is provided with a plurality of upright partitions attached to the plate and arranged to subdivide the upper plate surface into a plurality of generally equal-area open-topped compartments.

With a proper coordination of liquid and gas flow rates, plate perforation arrangement and spacing dimensions, the gas and liquid will form gasified liquid masses in the compartments leading to stabilized liquid holdup encouraging both intimate contact and sufficient contact time for adequate chemical interchange between the media for absorption purposes. The cleaned gases 80 continue rising through tower 50 to mist eliminator 70 before exiting through outlet 75, while contaminants removed from the gases are disposed of with the discharged liquid.

A second known type of flue gas desulfurization system is illustrated by FIG. 2, in which horizontally flowing flue gas 40 is treated with slurry 65 introduced from headers 67 mounted in the top of the desulfurization chamber 51. The slurry 65 is essentially sprayed "cross-currently," i.e. in cross flow, perpendicular to the flow of flue gas 40. The cleaned gas 80 leaves the chamber 51 after passing through mist eliminator 70 adjacent to outlet 75. Liquid slurry with contaminants is drained from the bottom or lower portion 53 of chamber 51 in any known manner.

These horizontal systems do not use a gas-liquid contact device such as the perforated tray as described above. Horizontal systems like that of FIG. 2 have been plagued with performance problems and limitations due to poor mixing of the gas and liquid. Stratification occurs where lighter flue gas seeks the top and heavier liquid reagent moves to the bottom of the reaction chamber without good mixing or sufficient contact time.

Horizontal flue gas desulfurization systems are sometimes required in retrofit applications due to space constraints. And, in new plants, a horizontal system is sometimes preferred for a variety of reasons including available space or height limitations.

Due to the harm caused by flue gas contaminants and the fact that a 100% efficient flue gas desulfurization system has not yet been created, there is always a need for improved cleaning systems which remove a greater fraction of contaminants from flue gases. Further, systems which are more cost efficient to manufacture and more easily retrofit into existing fossil fuel combustion plants are highly desirable. A more effective horizontal flue gas desulfurization system is very desirable due to the lag in effectiveness between horizontal and vertical systems.

SUMMARY OF INVENTION

It is an object of the present invention to create improved mixing of slurry and flue gas in an area of a horizontal flue gas desulfurization system with limited cross section in the horizontal direction of gas flow.

It is another object of the invention to improve gas-slurry contact in a horizontal flue gas desulfurization system and increase the available area for this contact.

Yet another object of the invention is to provide a horizontal desulfurization system having stepped slurry sprays introduced via headers at varying elevations and distances in a flue.

A further object of the invention is to overcome performance problems associated with horizontal flue gas desulfurization systems.

A still further object of the invention is to reduce pressure drop and power consumption in vertical flue gas desulfurization systems.

Accordingly, a variable vertical cross-section, stepped absorption tray is provided in a flue gas desulfurization system for creating a zone of increased flue gas and slurry mixing. In one embodiment, the tray includes a combination "Z" support, guide vane and liquid baffle which simplify fabrication and construction of the tray. The combined functions of the "Z" support, acting simultaneously as a structural support, a gas guide vane and a liquid retaining device, helps to minimize cost and improve the ease of installation in new or retrofit applications.

This invention thus solves the performance problem, which has plagued these types of horizontal liquid-gas reaction chambers caused by poor liquid-gas mixing due to stratification where the flue gas remains at the top of the absorption chamber and the liquid seeks the bottom.

In one embodiment the invention provides a flue gas desulfurization unit comprising a chamber having a bottom, a sidewall and an inlet and an outlet defining a flowpath therethrough. A stepped, perforated tray defining a plurality of open top compartments having perforated floors is positioned within the chamber spanning the flowpath. Means for spraying a slurry into the flue gas are located above the stepped tray.

In another embodiment the invention provides a horizontal flue gas desulfurization unit with increased flue gas contact area, comprising a chamber having an inlet, an outlet, a pair of side walls, and a bottom. A stepped, perforated tray, positioned within the chamber, extends between the side walls forming a plurality of open top compartments having perforated floors. The tray is stepped downwardly from the inlet toward the outlet.

In yet another embodiment the invention provides a flue gas desulfurization system comprising a chamber having a bottom, at least one side wall, a gas inlet and a gas outlet. A stepped tray, defining a plurality of open top compartments with perforated floors, steps downwardly from adjacent the gas inlet. Means for spraying a slurry against a flow of flue gases flowing upwardly through the perforated floors of the compartments are located above the stepped tray.

In a further embodiment the invention provides a flue gas desulfurization system comprising a chamber having one or more side walls, a gas inlet and a gas outlet defining a flowpath therethrough. A stepped tray defines a plurality of open top compartments positioned within and extending across the chamber from the one or more side walls. The tray includes a support having a vertical section and a lower flange. A first perforated plate is connected to the vertical section adjacent the lower flange. A second perforated plate, vertically and horizontally spaced from the first perforated plate, is connected to the vertical section above the lower flange. Stepped means for spraying a slurry against a flow of flue gases flowing upwardly through the first and second perforated plates are located above the stepped trays.

In a still further embodiment the invention comprises a tray for use in a gas-liquid contact device, comprising a plurality of vertically and horizontally spaced, horizontally disposed perforated plates.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
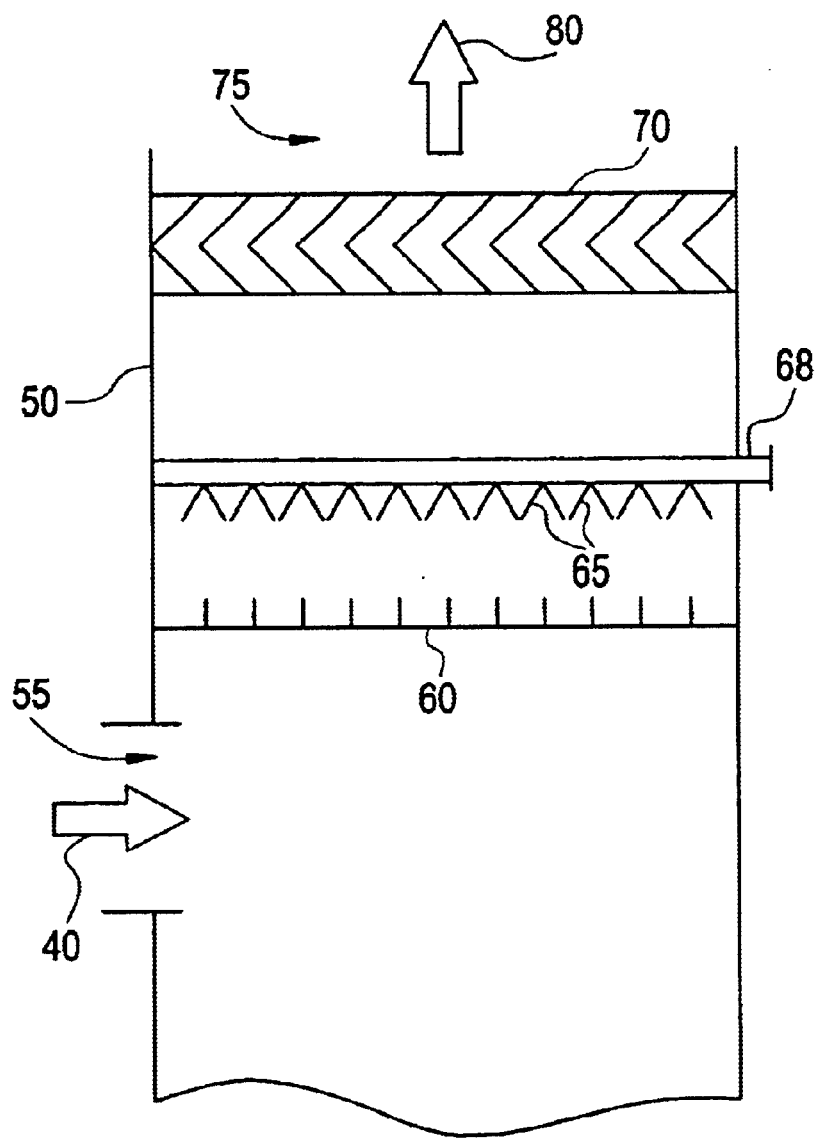
FIG. 1 is a sectional side elevation view of a prior art vertical flue gas desulfurization tower.
Figure 2:
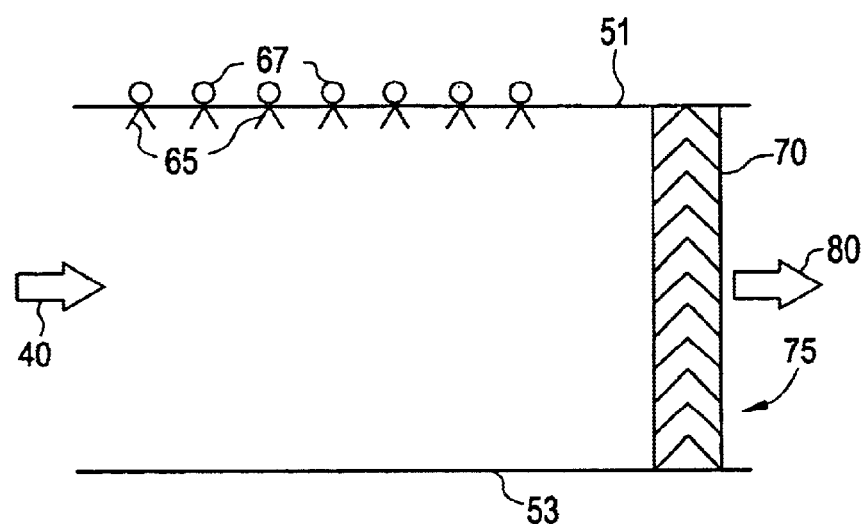
FIG. 2 is a sectional side elevation view of a prior art horizontal flue gas desulfurization chamber.
Figure 3:
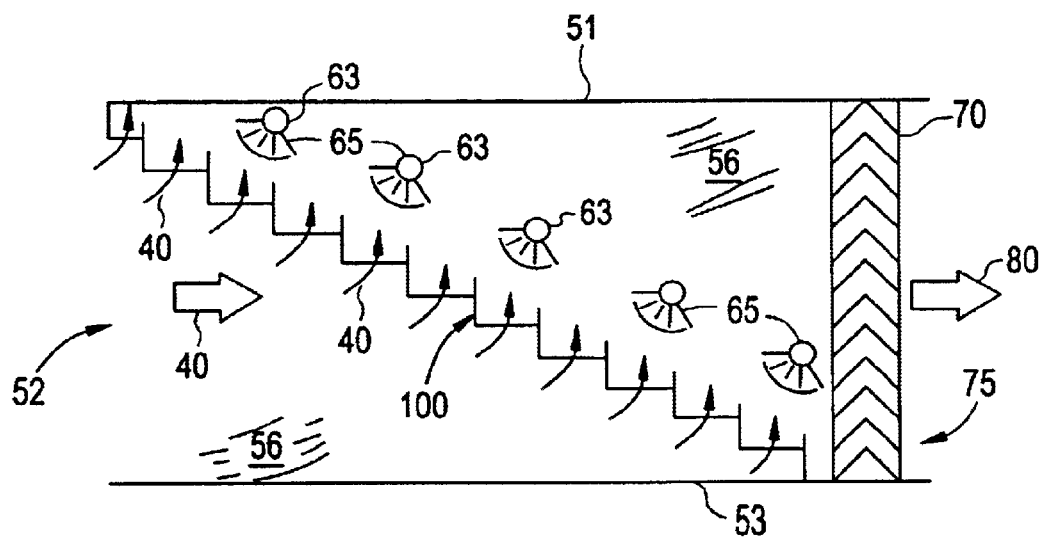
FIG. 3 is a sectional side elevation view of a horizontal flue gas desulfurization chamber according to the invention.

Referring now to the drawings, in which like reference numerals are used to refer to the same or similar elements, FIG. 3 illustrates a horizontal flue gas desulfurization chamber 51 having a perforated, variable vertical cross-section, stepped absorption tray 100 of the invention for increasing size of the gas-liquid contact region inside the chamber 51. The tray 100 is arranged stepped downwardly from the entrance 52 of the chamber 51 toward a mist eliminator 70 adjacent the outlet 75.

The tray 100 provides a region for improved mixing of slurry 65 and flue gas 40 within chamber 51. Chamber 51 comprises an area with an otherwise limited cross-section in the horizontal direction of gas flow. Installing a stepped, perforated tray 100 retains the gas-slurry mixture within a contact region. The flue gas 40 may pass upwardly through the tray 100 into contact with slurry 65 sprayed from slurry spray headers 63. The liquid slurry 65 in turn passes downwardly through tray 100 after mixing with flue gases 40 and removing a substantial portion of contaminant gases, such as SOx and NOx. Liquid slurry with contaminants is drained from the bottom or lower portion 53 of chamber 51 in any known manner.

Further, tray 100 locally redirects the flow of flue gas 40 vertically, thereby increasing the available contact area and slowing the flue gases to improve gas-slurry contact. The tray 100 effectively changes the gas-slurry contact from cross-current (perpendicular paths) to counter-current (opposing directions), which greatly improves the effectiveness of the desulfurization chamber 51.

As will be understood, a horizontal flue gas desulfurization chamber 51 is typically much longer than it is wide or high, so that the cross-sectional area of the gas flow path is much less than the top-down area of the chamber 51. The stepped tray 100 takes advantage of the length of the chamber 51 to produce a substantially increased surface area for gas-slurry contact by redirecting the gas flow vertically through the perforated plates 120 of tray 100, as shown in FIG. 4.

Referring again to FIG. 3, to take full advantage of the increased gas-slurry contact area provided by the tray 100, slurry spray headers 63 are also preferably arranged stepped at varying elevations along the length of tray 100. The stepped spray headers 63 ensure the stepped tray 100 remains fully flooded with slurry 65 and provide counter-current spray in the chamber 51.

After the flue gases 40 pass through tray 100 and sprays of slurry 65, the cleaned flue gases with some slurry entrained therein passes through mist eliminator 70. Mist eliminator 70 functions in a known manner to remove entrained liquid slurry droplets and return the slurry to the other pool of slurry being discharged from the chamber 51.

Figure 4:
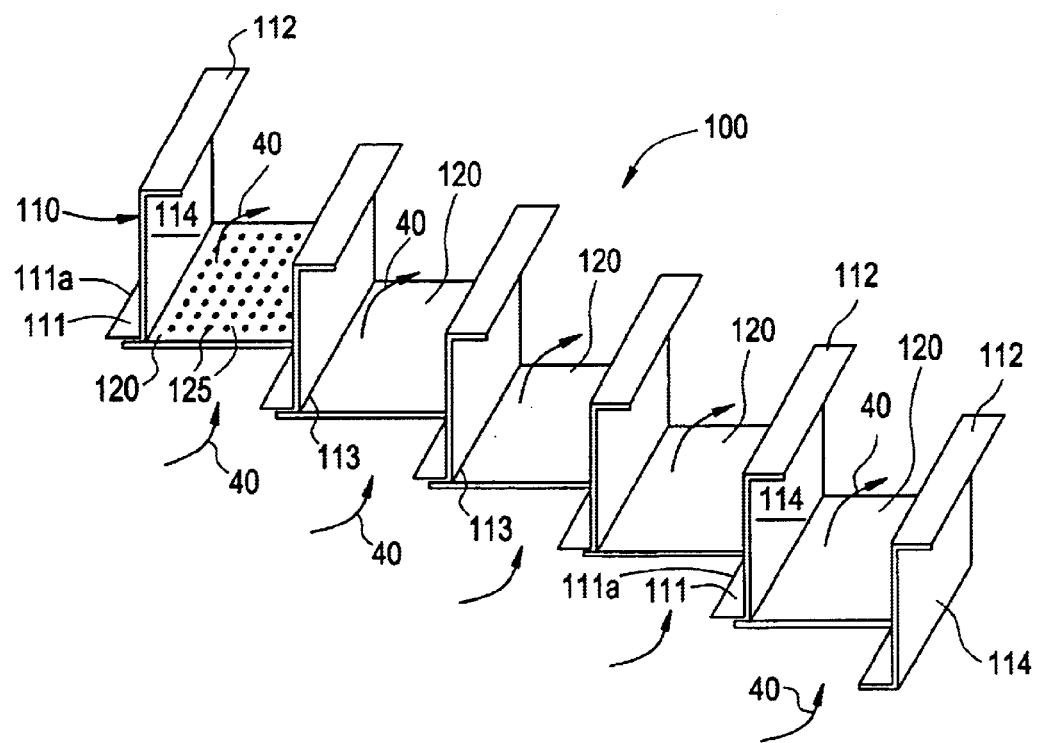
FIG. 4 is a perspective view of a baffle system used to increase vertical cross-sectional area in the chamber of FIG. 3.

A preferred construction for tray 100 is illustrated by FIG. 4. As shown, tray 100 is formed by connected perforated plates 120 and "Z" supports 110, which simultaneously perform the function of supports, guide vanes and liquid baffles. The Z supports 110 significantly simplify fabrication and construction. The combined function of structural support, gas guide vane and liquid retaining device helps to minimize cost and improve the ease of installation.

Each Z support 110 has a pair of upper and lower flanges 112, 111 connected to the upper and lower ends, respectively, of vertical section 114. The flanges 111, 112 direct the oncoming flow of flue gas 40 from a horizontal flow to a vertical flow, through perforated plates 120. The leading edges 111a of the lower flanges 111 scoop oncoming flue gases 40 and direct the flue gases 40 in conjunction with the adjacent lower portions of vertical sections 114. Upper flanges 112 similarly guide the flue gases 40 back to a horizontal downstream flow after exiting the perforated plates 120.

The flow disruption created by the flue gas redirection with the Z supports 110 can be adjusted by changing the size of the Z supports 110 to maximize the gas-slurry contact time while preventing the loss of flue gas velocity from having a significant negative impact on the performance of downstream systems.

Each perforated plate 120 has a plurality of holes or perforations 125 through the plate 120 sized to permit flue gases to flow through at a minimum velocity, while used slurry drains downwardly. The Z supports 110 and perforated plates 120 extend between side walls 56 of the chamber 51, so that substantially all the area between the chamber walls is occupied by the tray 100 along its length, spanning the flow path of flue gases 40.

The Z supports are mounted with the corner 113 of their lower flange 111 secured to a front edge of one of the perforated plates 120, and a second perforated plate 120 connected to about the middle of the vertical section 114. Thus, the Z supports 110 and perforated plates 120 form a descending staircase of open top compartments with perforated floors defined by the side walls 56, and at least a portion of the vertical sections 114 of each adjacent Z support 110.

Figure 5:
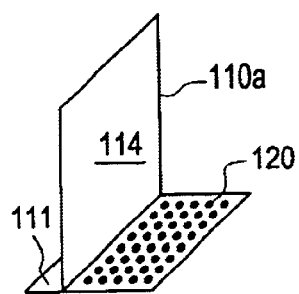
FIG. 5 is a perspective view of an alternate support and plate for making the tray of FIG. 4.

FIG. 5 illustrates an alternative L-shaped support 110a for use with tray 100. The L-shaped support 110a has only lower flange 111, and the upper edge of vertical section 114 is free. This support will not redirect gas flow to one side or the other as well as it leaves the tray 100.

The tray 100 and stepped slurry headers 63 solve the performance problem of horizontal liquid-gas reaction chambers, such as flue gas desulfurization chamber 51, caused by poor liquid-gas mixing as a result of stratification where the lighter flue gas 40 remains at the top of the absorption chamber 51 and the liquid slurry 65 seeks the bottom.

Use of the variable vertical cross section stepped absorption tray 100 effectively minimizes or eliminates gas-slurry stratification in horizontal gas flow liquid-gas contact devices by creating a uniform pressure drop across the flow cross section. Further, the variable vertical cross section stepped absorption tray 100 provides improved liquid gas contact area by creating a counter-current liquid-gas interchange where only a cross-current interchange was present.

Use of the variable vertical cross section stepped absorption tray 100 in a horizontal flue gas desulfurization chamber 51 results in increased absorber efficiency and performance due to improved gas-slurry contact without increasing the size of the existing absorber vessel or increasing the liquid to gas ratio. In fact, it may be possible to reduce the liquid to gas ratio due to the greatly improved gas-slurry contact. This is because a uniform head of liquid is created within the compartments defined by the tray 100 and chamber side walls 56 through which all flue gas 40 intended for treatment must pass in order to exit the chamber 51. The significant effect of this is to produce an increased liquid-gas contact area as well as increased liquid-gas contact time thus increasing the efficiency of the system for a given liquid to gas ratio.

The presence of a variable vertical cross section stepped absorption tray 100 may also result in increased mist eliminator 70 efficiency and decreased maintenance from the improved flow distribution to the mist eliminator 70.

The retrofit installation of stepped trays 100 in the many existing horizontal flow scrubbers will allow the owner/operators of these systems to increase SOx removal without increasing operating costs due to the increased efficiency. Cleaner air with no increase in operating costs is the result.

Use of the variable vertical cross section stepped absorption tray 100 may be applied to other types of liquid-gas systems using other reagents and gases than traditional wet limestone flue gas desulfurization systems.

Without installing tray 100 in existing horizontal systems, the only alternative for improving efficiency of a horizontal gas flow scrubber would be a new flue gas desulfurization chamber 51 of increased size to thereby decrease gas velocity and/or accommodate more slurry sprays thereby increasing liquid to gas ratio. This is essentially a new scrubber and not cost effective for owner operators who have maintained their horizontal gas flow systems and desire the benefit of increased performance efficiency from their existing systems. And, the cross-sectional area of the horizontal flow path cannot be increased as much as by using tray 100, nor will the benefits of counter-current gas-slurry contact be realized.

Materials used to make the tray 100 components include stainless and/or nickel alloy steel for the perforated plates 120 and Z supports 110. Alternative materials such as plastics or fiberglass can also be used. Packing can be used to create the reaction surface on tray 100 and resistance required. The packing needs to be positioned in such a way as to step across the horizontal distance of the absorber chamber creating the variable vertical cross-section thereby improving liquid-gas contact.

The connection between the perforated plates 120 and Z supports 110 can be by bolting or welding when these parts are fabricated from metal. For fiberglass reinforced plastic construction, the attachment may be bolted, glued or fused.

The stepped spray headers 63 can be constructed of rubber lined and coated steel piping, various plastics, refractory or stainless steel. The liquid spray need not be limited to slurry 65 but may be used to introduce other reagents such as liquid solutions, dry solids or gaseous products as needed for the process requirements or to improve the cleaning efficiency of the system.

Figure 6:
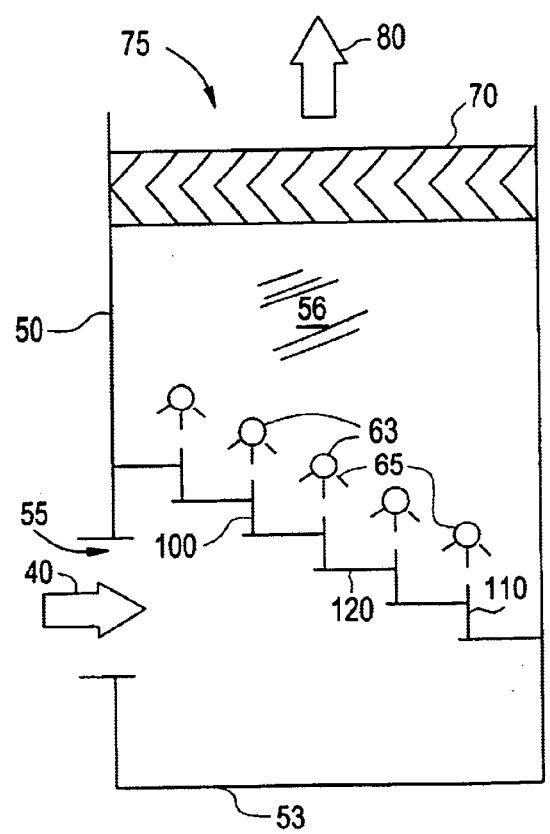
FIG. 6 is a sectional side elevation view of a vertical flue gas desulfurization tower incorporating the baffle system of FIG. 4.

And, as illustrated in FIG. 6, the tray 100 can be used in vertical flue gas desulfurization systems as well. The stepped tray 100 can be applied to typically cylindrical tower 50 systems that utilize vertical gas flow by installing the tray steps extending from side wall 56 across the inlet 55 for flue gas 40. In this embodiment, the tray 100 functions as a turning vane for the inlet 55 thereby reducing pressure drop and lowering power consumption. An additional benefit is reduced pumping power consumption due to the lower elevation of sprays from the stepped configuration, since the entire tower 50 can be made shorter as the tray 100 increases contact surface area along a stepped diagonal rather than horizontally or vertically.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles. For example, perforations may be included only in the horizontal or in both vertical and horizontal directions, depending upon the desired gas distribution effect.

I claim:

1. A flue gas desulfurization unit, comprising:
a chamber having a bottom, a sidewall and an inlet and an outlet defining a flowpath therethrough;
a stepped, perforated tray defining a plurality of open top compartments having perforated floors, the tray positioned within the chamber spanning the flowpath; and
means located above the stepped tray for spraying a slurry into the flue gas, wherein the means for spraying a slurry comprises a plurality of spray headers positioned at different vertical distances above the bottom of the chamber.

2. The desulfurization unit of claim 1, wherein the tray is stepped downwardly from the inlet toward the outlet.

3. The desulfurization unit of claim 2, wherein the means for spraying a slurry comprises a plurality of spray headers positioned at decreasing vertical distances above the bottom from the inlet toward the outlet.

4. The desulfurization unit of claim 1, wherein the flue gas desulfurization unit comprises a horizontal flue gas desulfurization unit.

5. The desulfurization unit of claim 1, wherein the flue gas desulfurization unit comprises a vertical flue gas desulfurization unit.

6. The desulfurization unit of claim 1, wherein the stepped tray comprises a plurality of vertical supports connecting perforated horizontal plates.

7. The desulfurization unit of claim 6, wherein the vertical supports comprise a vertical section and a perpendicular lower flange, the lower flange of each vertical support connected to an adjacent perforated plate.

8. The desulfurization unit of claim 1, wherein the tray comprises:
a support having a vertical section and a lower flange;
a first perforated plate connected to the vertical section adjacent the lower flange; and
a second perforated plate, vertically and horizontally spaced from the first perforated plate, and connected to the vertical section above the lower flange.

9. The desulfurization unit of claim 8, wherein the vertical section is perforated.

10. A horizontal flue gas desulfurization unit with increased flue gas contact area, comprising:
a chamber having an inlet, an outlet, a pair of side walls, and a bottom;
a stepped, perforated tray positioned within the chamber extending between the side walls forming a plurality of open top compartments having perforated floors, the tray stepped downwardly from the inlet toward the outlet; and
a plurality of spray headers extending across the chamber above the tray, the spray headers positioned at different vertical distances above a bottom of the chamber.

11. The desulfurization unit of claim 10, wherein the spray headers are arranged so that the spray headers are decreasingly vertically positioned above the bottom from the inlet toward the outlet.

12. A flue gas desulfurization system comprising:
a chamber having a bottom, at least one side wall, a gas inlet and a gas outlet;
a stepped tray defining a plurality of open top compartments with perforated floors, the tray stepped downwardly from adjacent the gas inlet, wherein the stepped tray comprises a plurality of vertical supports connecting perforated horizontal plates, wherein the vertical supports comprise a vertical section and a perpendicular lower flange, the lower flange of each vertical support connected to an adjacent perforated plate; and
means, located above the stepped tray, for spraying a slurry against a flow of flue gases flowing upwardly through the perforated floors of the compartments.

13. A flue gas desulfurization system comprising:
a chamber having a bottom, at least one side wall, a gas inlet and a gas outlet;
a stepped tray defining a plurality of open top compartments with perforated floors, the tray stepped downwardly from adjacent the gas inlet, wherein the stepped tray comprises a plurality of vertical supports connecting perforated horizontal plates; and
means, located above the stepped tray, for spraying a slurry against a flow of flue gases flowing upwardly through the perforated floors of the compartments, wherein the means for spraying a slurry comprises a plurality of spray headers spaced above the stepped tray at different vertical distances from the chamber bottom.

14. A flue gas desulfurization system comprising:
a chamber having one or more side walls, a gas inlet and a gas outlet defining a flowpath therethrough;
a stepped tray defining a plurality of open top compartments positioned within and extending across the chamber from the one or more side walls, the tray comprising:
a support having a vertical section and a lower flange;
a first perforated plate connected to the vertical section adjacent the lower flange;
a second perforated plate, vertically and horizontally spaced from the first perforated plate, and connected to the vertical section above the lower flange; and stepped
means, located above the stepped trays, for spraying a slurry against a flow of flue gases flowing upwardly through the first and second perforated plates.

15. A flue gas desulfurization system according to claim 14, wherein the vertical section has an upper flange.

16. A flue gas desulfurization system according to claim 14, wherein the vertical section is perforated.

17. A tray for use in a gas-liquid contact device, comprising a plurality of vertically and horizontally spaced, horizontally disposed perforated plates;
a vertical section having a lower flange;
a first perforated plate connected to the vertical section adjacent the lower flange; and
a second perforated plate, vertically and horizontally spaced from the first perforated plate and connected to the vertical section above the lower flange.

18. A tray for use in a gas-liquid contact device, comprising a plurality of vertically and horizontally spaced, horizontally disposed perforated plates;
wherein the perforated plates are arranged at decreasing elevations along the length of the tray; and
wherein the vertical section has an upper flange.

19. A tray for use in a gas-liquid contact device, comprising a plurality of vertically and horizontally spaced, horizontally disposed perforated plates;
wherein the perforated plates are arranged at decreasing elevations along the length of the tray; and
wherein the vertical section is perforated.

* * * * *